United States Patent

Boldin et al.

[11] Patent Number: 5,949,662
[45] Date of Patent: Sep. 7, 1999

[54] NO-BREAK POWER SUPPLY

[75] Inventors: Detlef Boldin, Effeltrich; Karl-Heinz Büttner, Erlangen; Roland Hümpfner, Herzogenaurach; Karl Fleisch, Erlangen, all of Germany

[73] Assignee: Siemens Aktiengesellschaft, München, Germany

[21] Appl. No.: 09/078,000

[22] PCT Filed: Nov. 29, 1996

[86] PCT No.: PCT/DE96/02291

§ 371 Date: Sep. 14, 1998

§ 102(e) Date: Sep. 14, 1998

[87] PCT Pub. No.: WO97/22170

PCT Pub. Date: Jun. 19, 1997

[30] Foreign Application Priority Data

Dec. 12, 1995 [DE] Germany ............ 195 46 420

[51] Int. Cl.⁶ .................. H02M 5/45; H02J 7/00
[52] U.S. Cl. .................................. 363/37; 307/66
[58] Field of Search ................. 363/34, 37, 39, 363/50, 51, 9, 157; 307/66; H02M 5/45

[56] References Cited

U.S. PATENT DOCUMENTS

| 4,010,381 | 3/1977 | Fickenscher et al. | 307/66 |
| 4,096,557 | 6/1978 | Schwarz | 363/9 |
| 4,626,978 | 12/1986 | Thouvenin | 363/36 |
| 4,827,151 | 5/1989 | Okado | 307/66 |
| 5,134,307 | 7/1992 | Nakano | 307/87 |
| 5,172,009 | 12/1992 | Mohan | 307/46 |
| 5,270,904 | 12/1993 | Gulczynski | 363/97 |
| 5,631,814 | 5/1997 | Zak | 363/37 |
| 5,684,686 | 11/1997 | Reddy | 363/97 |

FOREIGN PATENT DOCUMENTS

| 398 722 | 11/1990 | European Pat. Off. . |
| WO 94/09545 | 4/1994 | WIPO . |

OTHER PUBLICATIONS

"Simovert Master Drives. Voltage–Source Converter for Three–Phase Drives 6SE70–2,2 to 200 kW," Siemens Catalog DA 65.1, Seimens AG, Division of Drive, Switch and Installation Technology, 1994.*Discussed in International Preliminary Examination Report.

"USV [Uninterruptible Power Supply] Series 42 Power Range 10 to 500 kVA," Siemens AG, Division of Drive, Switch and Installation Technology, 1994, pp. 1–23.**Described in Specification.

*Primary Examiner*—Adolf Deneke Berhane
*Attorney, Agent, or Firm*—Kenyon & Kenyon

[57] ABSTRACT

An uninterruptable power supply device includes a mains commutation conductor, a voltage intermediate circuit converter having an associated control device, an output filter comprising a transformer with high leakage inductance and filter capacitors, a mains reset device having an associated control device, and a manual bypass switch. A frequency converter (32) from drive technology is used as the converter, an input filter is connected upstream of this frequency converter, and a battery coupling apparatus is connected to its DC busbar connections. In this way, it is possible an uninterruptable power supply device may be provided which uses the technical and economic synergies from drive technology using commercially available components from drive technology and using UPS-specific components.

9 Claims, 2 Drawing Sheets

NO-BREAK POWER SUPPLY

FIELD OF THE INVENTION

The present invention relates to an uninterruptable power supply device.

BACKGROUND INFORMATION

An uninterruptable power supply device is commercially available and is described, for example, in the Siemens Prospectus "Statische unterbrechungsfreie Stromversorgungen" (Solid-state uninterruptable power supplies) entitled "USV Reihe 42 Leistungsbereich 10 bis 500 kVA" (Series 42 UPS, power range 10 to 500 kVA), Order No. E20001-P161-A4.

FIG. 1 shows a simplified, summary circuit diagram of such an uninterruptable power supply device 2 (UPS device) This UPS device 2 comprises a voltage intermediate circuit converter 4, which includes a component rectifier 6, voltage intermediate circuit 8 and invertor 10. In addition, the UPS device 2 also has the following components: mains commutation inductor L10, mains reset device 12, output filter 14, control device 16 for the converter 4, control device 18 for the mains reset device 12, rectifier input switch Q10, manual bypass switch Q50, mains reset device switch Q51, DC busbar connections C and D, mains connections U1, V1, W1 of the rectifier 6, mains connections U2, V2, W2, N of the mains reset device 12, connections U3, V3, W3, N for a load, connections U4, V4, W4, N for a parallel block, a control panel 20, a monitoring and diagnosis system 22 and remote signalling 24.

A full-wave thyristor three-phase bridge (6-pulse) is provided as the rectifier 6. Optionally, a 12-pulse three-phase bridge can also be provided for the rectifier 6, in order to reduced considerably the mains feedback. For a rating of 500 kVA, the UPS devices are always designed as 12-pulse devices. In the case of the 12-pulse version of the rectifier 6, two balanced 6-pulse three-phase bridges are used, which operate electrically offset through 30° with the aid of a transformer. The control and regulation of the rectifier 6, which is implemented in the converter controller 16, includes the following functions:

software-controlled, battery-conserving automatic charger with IU characteristic and charging current limiting current limiting to prevent overloading of the rectifier reduced current limiting and inclined voltage characteristic for operation from a standby mains system controlled rise: slow voltage and current rise, no inrush current surges controlled current splitting during parallel operation of two rectifiers in order to prevent nonuniform stresses staggered rise of the rectifiers in multi-block systems.

The voltage intermediate circuit 8 is designed as a filter circuit. This filter circuit comprises two inductors L11 and a capacitor C20. The two inductors L11 are each integrated in a DC busbar. This filter circuit reduces the natural ripple on the DC voltage and eliminates any voltage spikes. The intermediate circuit voltage is smoothed, and the ripple on the battery current becomes very low. This conserves the battery. The "UPS principle" is based on the fact that the intermediate circuit voltage is kept either by the mains system or in the event of its failure—by the battery in a range which makes it possible for the invertor to keep the output voltage constant.

The invertor 10 comprises a transistor bridge circuit which is connected on the output side to the output filter 14 downstream. This output filter 14 comprises a transformer T20 which has high leakage inductance, and filter capacitors C30. Together with the filter capacitors C30, the leakage inductances of the transformer T20 form the three-phase output filter 14, which filters the fundamental out of the pulse-widthmodulated invertor output voltage and thus produces a sinusoidal output voltage with a low distortion factor. The output voltage is regulated by driving the invertor phases using the method of pulse-width modulation (PWM) with a supersinusoid. Because of the high pulse repetition frequency, the regulation can act very quickly (instantaneous value regulation). Since the waveform of the output voltage is in consequence actively influenced, the feedback effects from loads with non-sinusoidal currents (non-linear load) are also compensated for. This control and regulation of the invertor 10, which is implemented in the converter controller 16, includes the following functions:

voltage regulation with a high dynamic response current limiting frequency regulation phase-angle regulation: exact synchronization with the mains system and with parallel UPS blocks, as a result of which there are no equalization currents and no current surges during changeover processes instantaneous value regulation: low distortion factor on the output voltage even in the case of a non-linear load, high peak currents, active influence on the waveform, high dynamic response pulse forming: the switching state of the power transistors is continuously monitored, no missing pulses possible, optimum utilization of the power section in limit situations.

The mains reset device 12 comprises a three-phase thryristor switch 26, a contactor K50 and a control device 18. The three-phase thyristor switch 26 can take over the load current, without any delay. After a predetermined time interval, the contactor K50 then takes over the continuous current. The mains reset device 12 switches without any interruption in the following cases:

overload on the invertor 10 short circuit invertor defect if the invertor 10 is turned off by hand.

The electronic components for control, regulation, protection, monitoring, display and operation can be plugged into a mounting rack and are accommodated on peripheral assemblies relating to their function or components. This electronics section is largely digitized with microprocessors and microcontrollers, SMD, multilayer and hybrid technology being used.

An independent monitoring and diagnosis system 22 is installed in the assemblies required for equipment operation. The display on the control panel 20 provides comprehensive information about the equipment condition and assists fault diagnosis. The system 22 keeps prepared up to date measurements ready to be called up, predicts the expected available battery bridging time using the characteristic method, provides statistical data, continuously stores analogue and digital values, records the processes before and after a defect, detects faults and assists in diagnosis.

The monitoring and diagnosis system 22 includes a battery-buffered process signal memory which continuously records numerous signal states from the UPS equipment. In the event of a fault, the memory process continues for a number of cycles so that the previous and subsequent history of the fault is recorded. The stored operating variables can subsequently be read out.

The display on the control panel 20 offers:
display of the block and system condition
selection of an automatic battery test
display of other up to date measurements and variables derived from them.

The rectifier input and mains reset device input of the UPS device 2 are connected to earth via radio suppression capacitors and are connected between phases and neutral conductors N with varistors (surge arrestors). Together with the LC filter in the voltage intermediate circuit 8, this protects the device against mains overvoltage.

As shown in FIG. 1, the components of the rectifier 6, voltage intermediate circuit 8 and invertor 10 are constructed separately and are arranged in a physically separated manner in the device 2 (interrupted lines). These components have been specifically developed for the application in UPS devices 2. This also applies to the output filter 14, the transformer T20 being special manufacture since it is used both for voltage conversion and for filtering. These components must largely be redeveloped for a new development of a UPS device 2.

Voltage intermediate circuit converters are commercially available for variable speed drives (Siemens Prospectus "Simovert Master Drives", Order No. E20002K4065-A111-A1). These frequency converters from drive technology are available as compact units or flush-mounted units. The compact units are designed in a space-saving "BOOKSIZE" format. They are easily mounted by hooking these compact units into a standard G-rail and using a central screw attachment on the underneath of the unit. The compact and flush-mounted units can be mounted without any gaps between them. This reduces the required switchgear cabinet area. The range of units is designed using a standard connection technique. The mains and DC voltage connections are at the top, and the motor connections generally at the bottom. The new generation of "Simovert Master Drives" equipment comprises a modular system of high-performance components. The components can be used individually for any application. Easy handling, simple mounting, easy wiring and a high level of standardization have been major items in the physical design of the units. This is evident in standardized housings, fastening, connection plane, and the linking of signal and bus lines.

The components are split into system components on the mains side, and system components on the load side. The system components on the main side include the mains commutation inductor and the mains filter. The mains commutation inductor is used to limit mains harmonics. The inductance of the mains commutation inductor reduces the harmonic currents in the converter and feed units as well as the input/return supply units. The effect of the inductor depends on the ratio of the mains short-circuit power to the drive busbar power. The mains filter reduces the radio interference voltages which occur in the converter, feed and input/output supply units to the limits for public mains systems.

The system components on the load side include the output inductor and a harmonic filter. The output inductors can be used to compensate for the active charge-changing currents in long cables. Iron inductors or ferrite inductors may be used. The harmonic filter in each case produces a sinusoidal voltage, which has a low distortion factor, from the pulse-width-modulated output signals from the invertor.

SUMMARY OF THE INVENTION

An object of the present invention provides a uninterruptable power supply device in which the development cost for the power section is to be minimized and existing synergies are used.

Since a commercially available frequency converter unit from drive technology is used as the voltage intermediate circuit converter for the uninterruptable power supply device, the development cost for the power section of the UPS device can be minimized. In addition, a proven and a technically accepted unit is used as the power section of the UPS device, so that the novel UPS device is produced by the addition of conventional components. Since the intermediate circuit voltage is smoothed only inadequately with respect to the battery by the use of the known frequency converter unit, the battery is connected to the connections of the voltage intermediate circuit using a battery coupling apparatus. The use of the frequency converter unit and the battery coupling apparatus allows these components of the UPS device to be positioned as required in the device, so that the physical size of this UPS device is reduced.

The control and regulation of the frequency converter unit can largely be adopted, since a constant voltage and a constant frequency are a special case of variable voltage and frequency operation. In consequence, further costs are saved in the development of a novel series of UPS equipment. The regulation of battery operation has now been shifted to the battery coupling apparatus.

In an advantageous exemplary embodiment of the uninterruptable power supply device, a harmonic filter is used instead of the special transformer having downstream filter capacitors. In consequence, a commercially available transformer with low leakage inductance can be used instead of this special transformer W4th high leakage inductance. This reduces the costs of the uninterruptable power supply device. In addition, the commercially available transformer requires a smaller installation space than the special transformers.

DETAILED DESCRIPTION OF THE INVENTION

Figure 1:
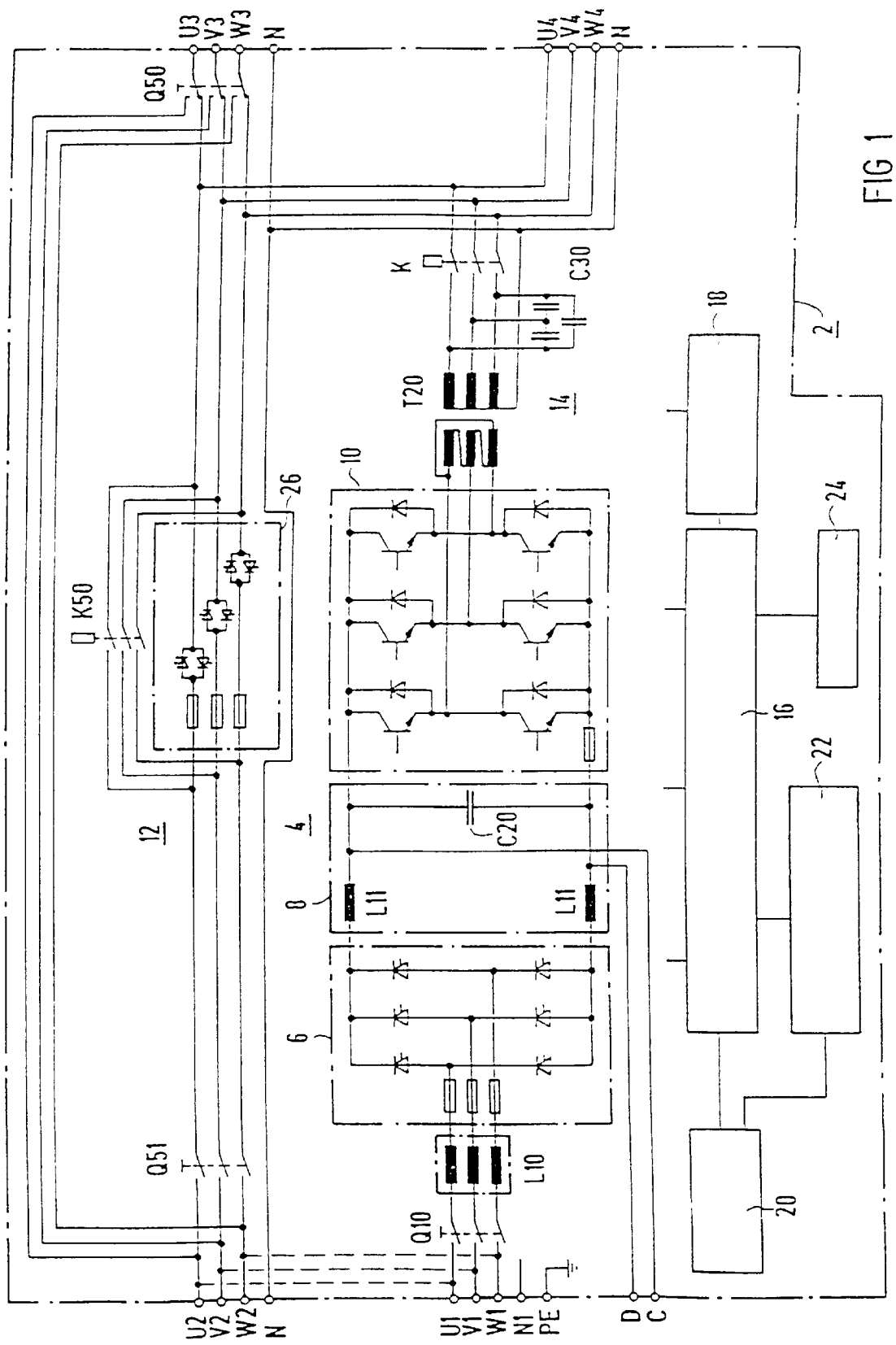
FIG. 1 shows a simplified summary circuit diagram of a conventional UPS device.
Figure 2:
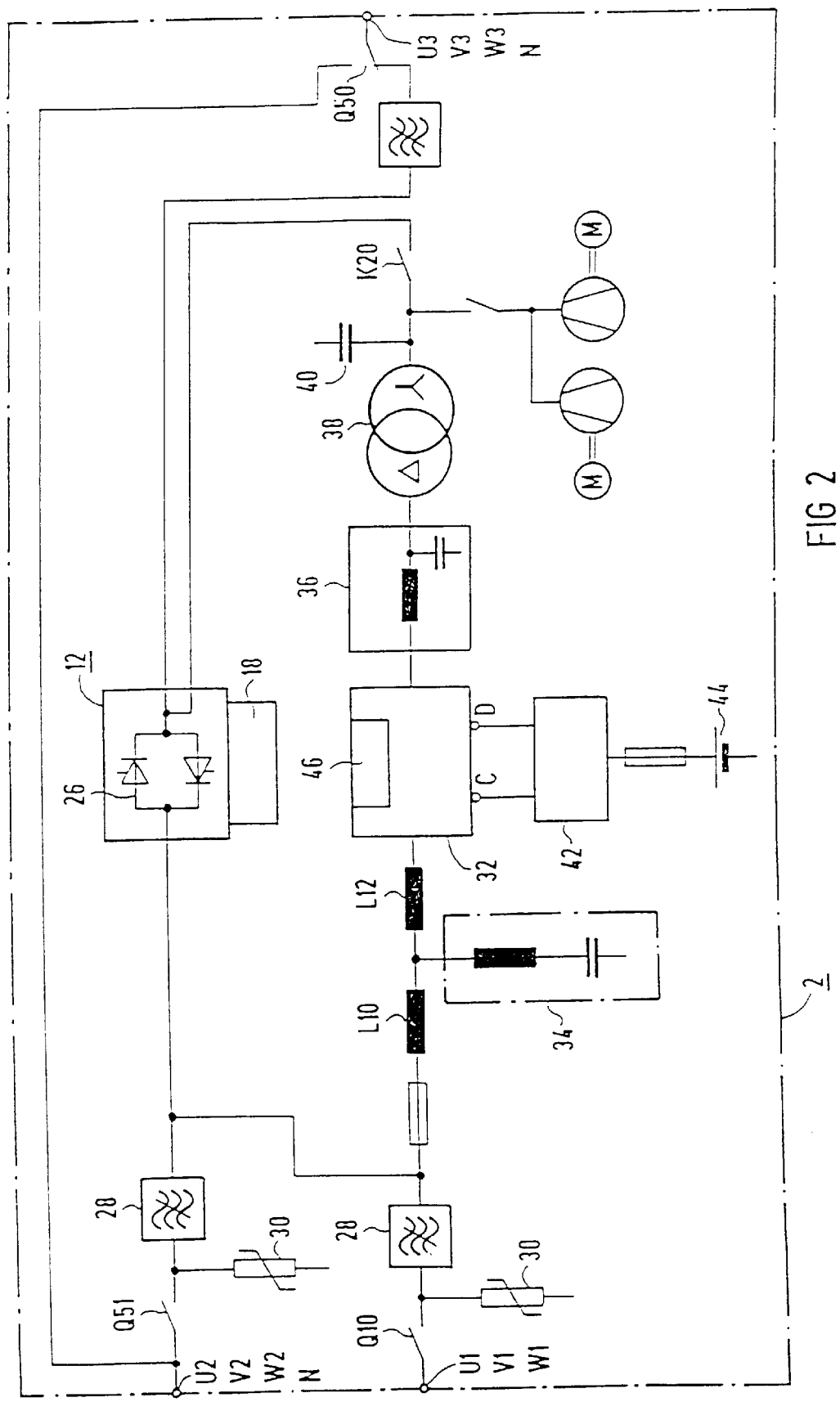
FIG. 2 shows a summary circuit diagram of an advantageous exemplary embodiment of a UPS device according to the present invention.

FIG. 2 shows a simplified summary circuit diagram of an advantageous exemplary embodiment of an uninterruptable power supply device 2 according to the present invention, the same components as in FIG. 1 being given the same reference symbols. FIG 2. shows the EMC filters 28 and the varistors 30, which are used for overvoltage protection. In order to avoid repetition, only the differences from the summary circuit diagram of the conventional UPS device 2 of FIG. 1 will be in connection with FIG. 2.

Instead of the voltage intermediate-circuit converter 4 according to FIG. 1, a commercially available frequency converter unit 32 from drive technology is used in the illustration in FIG. 2. On the input side, this frequency converter 32 is provided with an inductor L11 and with an input filter 34. On the output side, this frequency converter 32 is provided with a harmonic filter 36. The harmonic filter 36 is provided on the output side with a transformer 38, downstream of which a compensation capacitor 40 is connected. A battery coupling apparatus 42, which is linked on the output side to a battery 44, is connected to the DC busbar connections C and D of the frequency converter unit 32. The design and method of operation of this battery coupling apparatus 42 are illustrated and described comprehensively in a German Patent Application submitted in parallel.

As described above, this frequency converter 32 from drive technology has a diode rectifier in a B6 circuit, an intermediate circuit capacitor and an invertor, the convertor active devices provided for the invertor being turn-off, field-controlled semiconductor components, in particular Insulated Gate Bipolar Transistors (IGBT). This frequency converter unit 32 likewise has a control and regulation device 46, which is entered in the block of the frequency converter 32 in a corresponding manner.

In order to relieve the load on the converter 32 from reactive displacement current caused by inductive load elements and by the magnetization current of the output transformer 38, compensation capacitors 40 are used on the load side. In order that the resultant converted current with a purely resistive UPS load has approximately the same magnitude as in the case of resistive-inductive load, the compensation capacitor 40 is selected for about 30% of the filter parallel current at the mains frequency. A capacitor whose size is about 10% of the compensation capacitor 40 is located in the harmonic filter 36. Taking account of the transformer transformation ratio, this compensates for any negative tolerances.

The harmonic filter 36 is available as an optional component for the frequency converter 32 from drive technology. It is used in the respective rating for the converter unit 32. It produces a virtually sinusoidal voltage from the square-waveform converter voltage pulses. It comprises passive LC filter circuits.

Since the transformer 38 need no longer interact with the output filter as well as providing voltage conversion, it is possible to use a transformer 38 having low leakage inductance. Such a transformer 38 is commercially available for a predetermined transformation ratio and a predetermined rating. A commercially available transformer 38 is more cost-effective than a special transformer T20 according to FIG. I having high leakage inductance and has a smaller physical size, which has an advantageous effect on the physical size of the UPS device 2.

An uninterruptable power supply device 2, which uses the technical and economic synergies from drive technology, can thus be designed using commercially available components from drive technology (frequency converter 32, battery coupling apparatus 42, input filter 34, harmonic filter 36 and transformer 38) and using UPS specific components (mains reset device 12, manual bypass switch Q50). This considerably reduces the development time and cost, as a result of which the physical size and the price of the UPS device 2 are reduced. The UPSspecific characteristics are achieved by modification of the electronics in the frequency converter unit 32.

What claimed is:

1. An uninterruptable power supply device, comprising:

a mains commutation inductor coupled to a first mains system;

a voltage intermediate circuit converter coupled downstream from the mains commutation inductor and including a frequency converter drive device and a voltage busbar connection;

a first control device coupled to the voltage intermediate circuit converter;

an output filter coupled to the voltage intermediate circuit converter and including a first transformer, the first transformer including filter capacitors;

a mains reset device coupled to a second mains system and including a second control device;

a manual bypass switch switching the second mains system to a load arrangement;

a battery conductively coupled to the voltage busbar connection;

an input filter coupled to the frequency converter drive device and being upstream from the frequency converter drive device; and a voltage-smoothing battery coupling apparatus arranged between the direct voltage busbar connection and the battery.

2. The uninterruptable power supply device according to claim 1, wherein the output filter includes a harmonic filter coupled to a second transformer, the second transformer being downstream from the harmonic filter and having a low leakage inductance.

3. The uninterruptable power supply device according to claim 2, further comprising:

a compensation capacitor coupled to the second transformer and being downstream from the second transformer.

4. The uninterruptable power supply device according to claim 1, further comprising:

an overvoltage protection arrangement coupled an input switch and the second mains system, the overvoltage protection arrangement being coupled downstream from the input switch and the second mains system.

5. The uninterruptable power supply device according to claim 1, wherein the uninterruptable power supply device has an input side and an output side, further comprising:

a first EMC filter coupled to the input side; and a second EMC filter coupled to the output side.

6. The uninterruptable power supply device according to claim 4, wherein the overvoltage protection arrangement includes a varistor.

7. The uninterruptable power supply device according to claim 1, further comprising:

a further inductor coupled to the mains commutation inductor and the frequency converter drive device, the further inductor being coupled downstream from the mains commutation inductor and upstream from the frequency converter drive device.

8. The uninterruptable power supply device according to claim 1, wherein the frequency converter drive device includes the input filter and a harmonic filter.

9. The uninterruptable power supply device according to claim 4, wherein the frequency converter device includes an EMC filter.

* * * * *